(12) United States Patent
Riazi et al.

(10) Patent No.: US 12,014,569 B2
(45) Date of Patent: Jun. 18, 2024

(54) SYNTHETIC HUMAN FINGERPRINTS

(71) Applicant: The Regents of the University of California, Oakland, CA (US)

(72) Inventors: Mohammad Sadegh Riazi, San Diego, CA (US); Seyed Mohammad Chavoshian, San Diego, CA (US); Farinaz Koushanfar, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 17/793,605

(22) PCT Filed: Jan. 29, 2021

(86) PCT No.: PCT/US2021/015916
§ 371 (c)(1),
(2) Date: Jul. 18, 2022

(87) PCT Pub. No.: WO2021/155301
PCT Pub. Date: Aug. 5, 2021

(65) Prior Publication Data
US 2023/0075233 A1    Mar. 9, 2023

Related U.S. Application Data

(60) Provisional application No. 62/967,942, filed on Jan. 30, 2020.

(51) Int. Cl.
*G06V 40/50* (2022.01)
*G06T 3/40* (2006.01)
(Continued)

(52) U.S. Cl.
CPC ........ *G06V 40/1365* (2022.01); *G06T 3/4046* (2013.01); *G06T 3/4053* (2013.01);
(Continued)

(58) Field of Classification Search
CPC .. G06V 40/1365; G06V 10/454; G06V 10/82; G06V 10/774; G06V 10/776;
(Continued)

(56) References Cited

U.S. PATENT DOCUMENTS

| 10,467,729 B1 | 11/2019 | Perera et al. |
| 2019/0138838 A1* | 5/2019 | Liu ...................... G06V 10/764 |

(Continued)

OTHER PUBLICATIONS

Arjovsky, M. et al., "Wasserstein gan," arXiv preprint arXiv: 1701.07875, 2017.
(Continued)

*Primary Examiner* — Lixi C Simpson
(74) *Attorney, Agent, or Firm* — Mintz Levin Cohn Ferris Glovsky and Popeo, P.C.

(57) ABSTRACT

In some embodiments, there is provided a system for generating synthetic human fingerprints. The system includes at least one processor and at least one memory storing instructions which when executed by the at least one processor causes operations, such as receiving, from a database and/or a sensor, at least one real fingerprint; training, based on the at least one real fingerprint, a generative adversarial network to learn a distribution of real fingerprints; training a super-resolution engine to learn to transform low resolution synthetic fingerprints to high-resolution fingerprints; providing to the trained super resolution engine at least one low resolution synthetic fingerprint that is generated as an output by the trained generative adversarial network; and in response to the providing, outputting, by trained super resolution engine, at least one high resolution synthetic fingerprint.

20 Claims, 7 Drawing Sheets

(51) Int. Cl.
| | |
|---|---|
| *G06T 3/4046* | (2024.01) |
| *G06T 3/4053* | (2024.01) |
| *G06V 10/44* | (2022.01) |
| *G06V 10/774* | (2022.01) |
| *G06V 10/776* | (2022.01) |
| *G06V 10/82* | (2022.01) |
| *G06V 40/12* | (2022.01) |

(52) U.S. Cl.
CPC .......... *G06V 10/454* (2022.01); *G06V 10/774* (2022.01); *G06V 10/776* (2022.01); *G06V 10/82* (2022.01); *G06V 40/1388* (2022.01); *G06V 40/50* (2022.01)

(58) Field of Classification Search
CPC .. G06V 40/50; G06V 40/1388; G06T 3/4046; G06T 3/4053
See application file for complete search history.

(56) References Cited

U.S. PATENT DOCUMENTS

| | | | |
|---|---|---|---|
| 2019/0295302 A1* | 9/2019 | Fu | G06V 10/82 |
| 2019/0355102 A1 | 11/2019 | Lin et al. | |
| 2020/0184053 A1* | 6/2020 | Kursun | G06V 10/764 |
| 2023/0005114 A1* | 1/2023 | Shin | G06V 10/7715 |

OTHER PUBLICATIONS

Bontrager, P. et al., "DeepMaster-Prints: Generating masterprints for dictionary attacks via latent variable evolution," in 2018 IEEE 9th International Conference on Biometrics Theory, Applications and Systems (BTAS). IEEE, 2018, pp. 1-9.

Cappelli, R. et al., "SFinGe: an approach to synthetic fingerprint generation," in International Workshop on Biometric Technologies (BT2004), 2004, pp. 147-154.

Chatterjee, R. et al., "Multisketches: Practical secure sketches using off-the-shelf biometric matching algorithms," in ACM CCS, 2019.

Goodfellow, I. et al., "Generative adversarial nets," in Advances in neural information processing systems, 2014.

Jolicoeur-Martineau, A., "The relativistic discriminator: a key element missing from standard gan," arXiv preprint arXiv:1807.00734,2018.

Karras, T. et al., "A style-based generator architecture for generative adversarial networks," in Proceedings of the IEEE Conference on Computer Vision and Pattern Recognition, 2019, pp. 4401-4410.

Komarinski, P., "Automated fingerprint identification systems (AFIS)," Elsevier, 2005.

Ledig, C. et al., "Photo-realistic single image super-resolution using a generative adversarial network," in Proceedings of the IEEE conference on computer vision and pattern recognition, 2017, pp. 4681-4690.

Lim, B. et al., "Enhanced deep residual networks for single image super-resolution," in Proceedings of the IEEE conference on computer vision and pattern recognition workshops, 2017, pp. 136-144.

Maltoni, D. et al., "Handbook of fingerprint recognition," Springer Science & Business Media, 2009.

Minaee, S. et al., "Finger-GAN: Generating Realistic Fingerprint Images Using Connectivity Imposed GAN," arXiv:1812.10482v1, Dec. 25, 2018, 6 pages.

Oord, A.v.d. et al., "Pixel recurrent neural networks," Proceedings of the 33rd International Conference on Machine Learning, New Nork, NY 2016, 10 pages.

Park, T. et al., "Semantic image synthesis with spatially-adaptive normalization," in Proceedings of the IEEE Conference on Computer Vision and Pattern Recognition, 2019, pp. 2337-2346.

Roy, A. et al., "Evolutionary methods for generating synthetic masterprint templates: Dictionary attack in fingerprint recognition," in 2018 International Conference on Biometrics (ICB). IEEE, 2018, pp. 39-46.

Syifaa, A. et al., "An Investigation of Fake Finerprint Detection Approaches," in AIP Conference Proceedings 1891, Oct. 3, 2017, pp. 1-7.

Wang, X. et al., "ESRGAN: Enhanced super-resolution generative adversarial networks, " in The European Conference on Computer Vision Workshops (ECCVW), Sep. 2018.

Wang, X. et al., "Recovering realistic texture in image super-resolution by deep spatial feature transform," in The IEEE Conference on Computer Vision and Pattern Recognition (CVPR), Jun. 2018.

Zhang, Y. et al., "Residual Dense Network for Image Super-Resolution," in Computer Vision Foundation, Sep. 20, 2018, pp. 2472-2481.

\* cited by examiner

SYNTHETIC HUMAN FINGERPRINTS

CROSS REFERENCE TO RELATED APPLICATIONS

This application is a national stage entry of Patent Cooperation Treaty Application No. PCT/US2021/015916 filed Jan. 29, 2021, entitled "SYNTHETIC HUMAN FINGERPRINTS," which claims priority to U.S. Provisional Patent Application No. 62/967,942, filed on Jan. 30, 2020, and entitled "SYNTHETIC HUMAN FINGERPRINTS," the disclosures of which are incorporated herein by reference in their entirety.

BACKGROUND

Fingerprints are increasingly being used to identify and/authenticate users before allowing access or performing a task, such as opening a door, unlocking a safe, making an electronic payment, and/or the like. The human fingerprint has a set of micro-features that can be used to identify the finger of a given person. Minutiae points correspond to the particular locations of the fingerprint, such as ridge bifurcations, endings, and/or the like. Each minutia is represented as a tuple of the location (e.g., x, y), orientation 0, and a quality factor q. Since different impressions of the same finger can result in drastically different minutiae tuples, fingerprint matching methodologies typically rely on a scale-invariant and rotation-invariant algorithms to detect whether two sets of minutiae points belong to the same finger.

SUMMARY

In one aspect, there is provided a machine learning framework for generating synthetic human fingerprints.

In some embodiments, there is provided a system for generating synthetic human fingerprints. The system includes at least one processor and at least one memory storing instructions which when executed by the at least one processor causes operations, such as receiving, from a database and/or a sensor, at least one real fingerprint; training, based on the at least one real fingerprint, a generative adversarial network to learn a distribution of real fingerprints; training a super-resolution engine to learn to transform low resolution synthetic fingerprints to high-resolution fingerprints; providing to the trained super resolution engine at least one low resolution synthetic fingerprint that is generated as an output by the trained generative adversarial network; and in response to the providing, outputting, by trained super resolution engine, at least one high resolution synthetic fingerprint.

In some variations, one or more of the features disclosed herein including the following features can optionally be included in any feasible combination. The at least one real fingerprint may include biometric data. The biometric data may be collected from at least one of a human finger, a human eye, a retina, an iris, a vein, an artery, and/or a voice. The at least one real fingerprint may be preprocessed by at least one of segmenting or centering the at least one real fingerprint. The preprocessing may further include storing the at least one real fingerprint in a first database at a first resolution and storing the at least one fingerprint in a second database in a second, lower resolution. The training of the generative adversarial network may be based on the at least one real fingerprint stored in the second, lower resolution, and wherein the training of the super-resolution engine may be based on the at least one real fingerprint stored in the first resolution. The generative adversarial network may include a Wasserstein generative adversarial network including an earth-mover distance loss function. The training of the generative adversarial network may include providing synthetic fingerprint samples and the at least one real fingerprint to a discriminator. The discriminator may provide feedback to a generator to learn to distinguish synthetic fingerprint samples from the real fingerprint samples. The super-resolution engine may include a Generative Adversarial Network and/or an Enhanced Super-Resolution Generative Adversarial Network. The super-resolution engine may include a plurality of residual dense blocks sandwiched within a first convolution layer and a second convolutional layer, wherein the output of second convolutional layer is provided to at least one upsampling layer, and wherein the upsampling layer is further coupled to at least one output convolutional layer configured to output a high quality fingerprint sample. The training of the super-resolution engine may include learning whether a real fingerprint is more realistic than a synthetic fingerprint.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to micro-meter feature-sized light emitting diodes, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
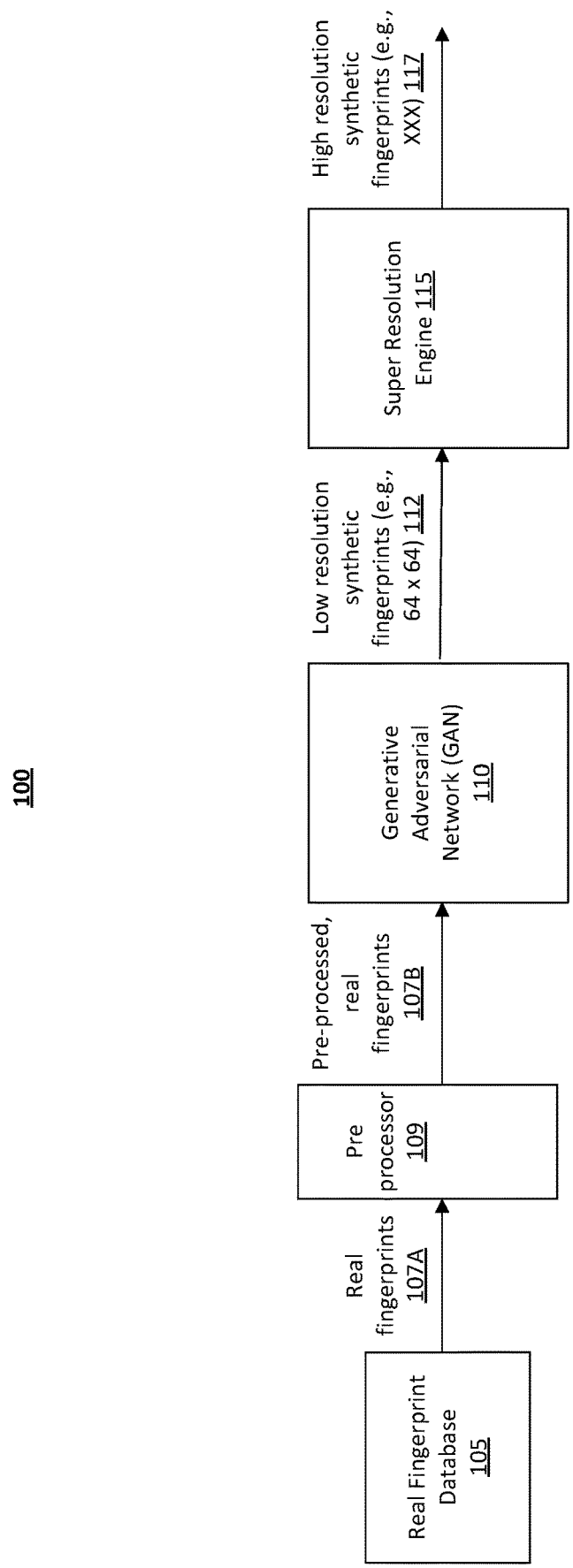
FIG. 1A depicts an example of a system for generating synthetic fingerprints, in accordance with some example embodiments.

Authentication and identification methods based on human fingerprints are ubiquitous in systems ranging from government organizations to consumer products. The performance and reliability of such systems directly rely on the volume of data on which they have been verified. Unfortunately, a large volume of fingerprint databases is not publicly available due to many privacy and security concerns.

Disclosed herein are systems, methods, and articles of manufacture for automatically generating high-fidelity synthetic fingerprints. In some example embodiments, there is provided a Generative Adversarial Network (GAN) configured to estimate the probability distribution of actual, real human fingerprints and to output low quality (e.g., resolution) synthetic fingerprints. Moreover, the GAN provides, in accordance with some example embodiments, the low quality synthetic fingerprint outputs to a Super-Resolution engine that synthesizes higher, resolution (e.g., fine grain) synthetic fingerprints. These synthetic fingerprints may then be generated at scale (e.g., to provide large quantities of fingerprints) to enable properly verifying the performance of fingerprint based systems, training machine learning systems to accurately perform tasks (e.g., fingerprint detection), and/or the like. In some implementations, the systems, methods, and articles of manufacture may be able to generate synthetic fingerprints that are computationally indistinguishable from real, actual fingerprints taken from subject.

In some example embodiments, there is provided a system framework to automatically generate high-quality synthetic fingerprints at scale. The system may formulate the process of generating synthetic fingerprints in two parallel deep learning tasks based on a Generative Adversarial Network (GAN) and a Super-Resolution (SR) engine. Moreover, the generated synthetic fingerprints may preserve the minutiae characteristics of fingerprints used for authentication systems (e.g., ridge structure, bifurcations, and ridge endings). Furthermore, the system may generate synthetic fingerprints having full finger impressions.

Human fingerprints are frequently used for authentication and/or identification in applications such as smart doors, payment authorization, and/or the like. Evaluating the performance and reliability of identification and verification fingerprint-based systems (e.g., analyze the robustness of a verification system against Trojan attacks) requires access to a large fingerprint database. In practice however, obtaining a massive corpus of fingerprint images can incur a high cost. In many cases, the groups developing fingerprint-based authentication systems do not have access to a large, publicly available database. The performance of these systems is directly dependent on the quality and quantity of the available fingerprint data. In addition to the above obstacles, gathering fingerprint impressions of a large population of people raises privacy and security concerns. In case of a breach, the fingerprint of many users may be directly exposed to attackers and can be used to fool authentication systems that accept fingerprints.

The generation of synthetic fingerprints may be used to solve some of the challenges mentioned above. Synthetic fingerprints can solve the availability concern of real fingerprint data as synthetic fingerprints can be generated for virtually any quantity of fingerprint samples. Moreover, synthetic fingerprints are artificially generated; hence, they do not have privacy issues about revealing any information about a real person. Moreover, fingerprints can be categorized based on their global structure and curvatures; some of these categories are drastically rarer, so their synthetically generated counterparts can be used to compensate for the lack of real data for these rarer fingerprint characteristics. And, the synthetically generated fingerprints need to produce impressions such that the distribution of minutiae points is the same or similar to real ones to enable fingerprint matching methodologies (which rely on a scale- and rotation-invariant algorithms to detect whether two sets of minutiae points belong to the same finger) to operate accurately.

As used herein, a synthetic fingerprint refers to data artificially generated based on one or more models, rather than obtained directly from a subject via a sensor collecting data from a subject. For example, a sensor (e.g., a scanner, imager, or other type of device) may capture data that represents an actual fingerprint of a human subject.

Although some of the examples refer to the fingerprint in terms of an image of the human finger, the fingerprint (whether real or artificial) may refer to other types of fingerprints, examples of which include eye scan data, retinal data, iris data, voice data, artery/vein data, and/or other types of biometrics data.

FIG. 1A depicts an example of a system 100 for generating synthetic fingerprints, in accordance with some example embodiments. The system 100 includes a database 105 including actual (e.g., real) fingerprints of human subjects, a preprocessor 109, a Generative Adversarial Network (GAN) 110, and Super Resolution (SR) engine 115.

The database 105 includes real fingerprints that are used to train the GAN 110 and the SR engine 115. In some implementations, the database 105 may include datasets of fingerprint images that are not centered and/or have unnecessary auxiliary information around the fingerprint image. When this is the case, the fingerprint images may be preprocessed by the preprocessor 109. For example, the preprocessor 110 may receive the real fingerprints 107A and segment the fingerprint from the background of the image, such that the segmented real fingerprints image is output at 107B. If the fingerprint database 105 includes pre-processed fingerprints, the preprocessor 109 may not be needed.

Figure 1B:
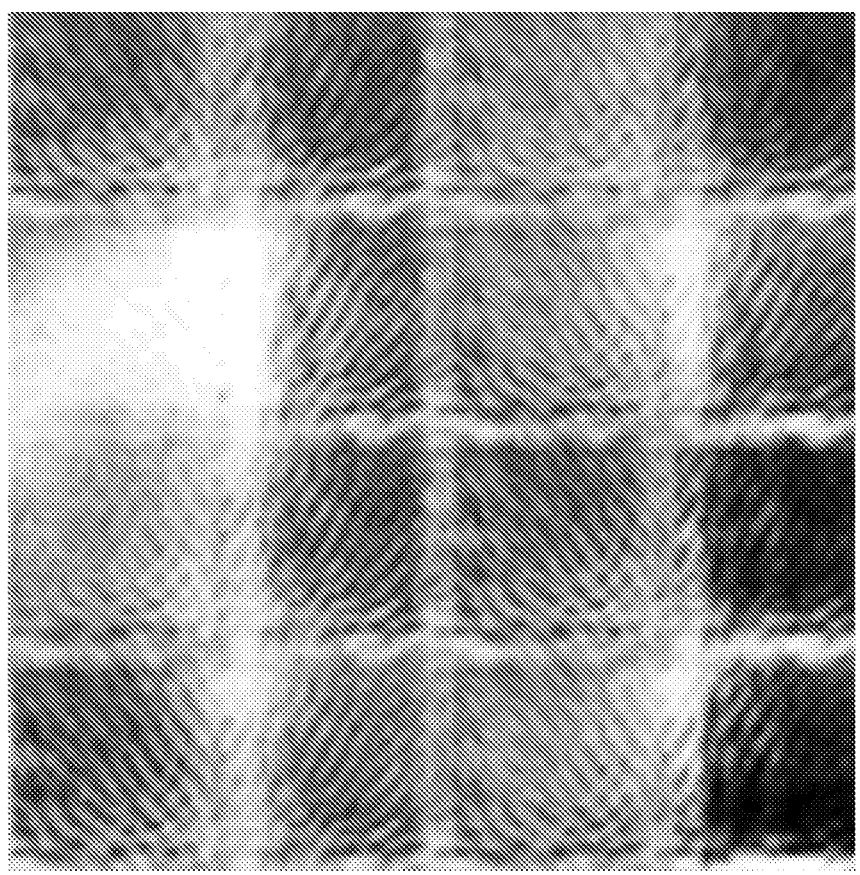
FIG. 1B depicts an example of a low resolution synthetic fingerprint generated by a Generative Adversarial Network, in accordance with some example embodiments.

The GAN 110 provides deep learning models that can estimate the distribution of a given dataset, such as a dataset of real fingerprints found in database 105, for example. In the GAN 110, two different neural networks are trained in parallel. The first neural network, the generative network, tries to generate synthetic fingerprint samples from the given data distribution of real fingerprints 105. The second neural network, the discriminator (also referred to as a critic) network, learns to distinguish the synthetic fingerprint samples (which are generated by the generative network during training) from the real fingerprint data samples 117A or B of the database 105. During the training phase of the GAN, the feedback from the discriminator network is used to enhance the quality of the samples produced by the generative network. In this way, the GAN 110 (when trained) can provide a model that estimates the probability distribution of real fingerprints. When trained for example, the GAN's output 112 may provide low quality fingerprint (e.g., images) from a randomly generated noise vector (e.g., seed) representing a latent variable. In other words, when the GAN 110 is trained, an input vector (e.g., a random or noisy vector) may be provided to the GAN 110, which causes a synthetic fingerprint image output at 112. Due to the small volume of the publicly available datasets however, the GAN cannot generalize well and produce realistic-looking fingerprint samples. As shown in the example of FIG. 1B, the low resolution synthetic fingerprints samples 112 generated by the GAN are of low quality.

In some example embodiments, the Super-Resolution (SR) engine 115 is used to transform the low-quality images 112 provided by the trained GAN 110 into a realistic, high quality samples 117. In other words, the SR engine recovers a high-resolution (HR) image from a low resolution (LR) image. The SR engine may up convert the resolution of the low resolution input image provided by the GAN 110, while maintaining the details and texture of ridge endings, bifurcations, and the like within the fingerprints. To illustrate further, the trained GAN 110 may be provided with a plurality of input noise vectors, each of which serves as a seed causing the generation of a plurality of different low resolution synthetic image outputs 112. These low resolution synthetic images 112 are then received by the trained SR model 115, which transforms the low-quality fingerprint images 112 into realistic, high-quality fingerprints images 117.

Figure 2:
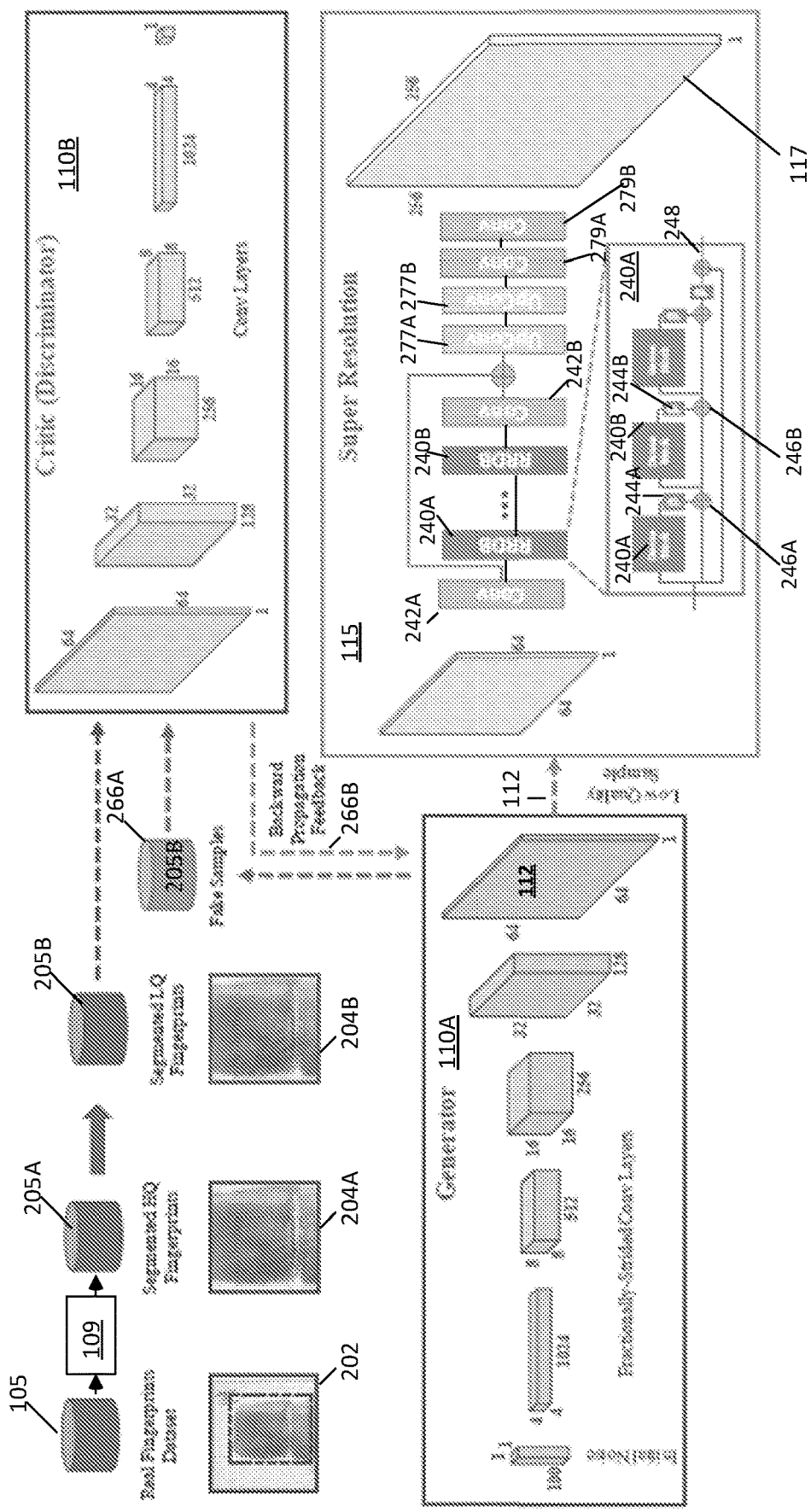
FIG. 2 depicts another example of a system for generating synthetic fingerprints with high-fidelity resolution to improve upon the synthetic low resolution depicted at FIG. 1B, in accordance with some example embodiments.

FIG. 2 depicts another example of a system 200 for generating synthetic fingerprints, in accordance with some example embodiments. The system 200 is similar to the system 100 in some respects but includes additional implementation examples with respect to the GAN 110 and SR engine 115. For example, the GAN 110 is depicted as a generator neural network 110A and a discriminator (also referred to as a critic) neural network 110B, in accordance with some example embodiments. Moreover, the SR engine 115 includes an example of a structure for the SR engine.

In the example of FIG. 2, the preprocessor 109 may preprocess real fingerprint data (e.g., images or types of data as noted above) obtained from the real fingerprint database 105. For example, the fingerprint images, such as image 202, obtained from the database 105 may contain artifacts, such as codes, numbers, and the like; and these images 202 may not be centered. In some example embodiments, the preprocessor 109 may detect the edges (e.g., boundary) of each fingerprint within each fingerprint image to crop the fingerprint image to remove some, if not all, of the background. The preprocessor 109 may perform other types of preprocessing as well including scaling the size of the fingerprint, centering the fingerprint image, and/or the like as shown at 204A (which shows the segmented, scaled, and centered fingerprint). In embodiments in which the fingerprints correspond to other types of biometric information, the preprocessor may be configured to preprocess, if needed, that data as well.

In some implementations, the database 105 may include a dataset of real fingerprints obtained at least in part from the National Institute of Standards and Technology's (NIST) Special Dataset (SD09). The SD09 dataset may be used to train the GAN 110 and SR engine 115, although other types of datasets of real fingerprints may be used as well. In the case of NIST's SD09 dataset, it includes 2 impressions of each of the 10 fingers of 2700 subjects, so there are 54000 real fingerprint images overall. The SD09 dataset includes metadata with each fingerprint, such as the subject's gender and the National Crime Information Center (NCIC) class (e.g., arch (A), left-loop (L), right-loop (R), tented-arch (T), whorl (W), and scar or mutilation (S)).

In the example of FIG. 2, the GAN 110 trains and operates using lower resolution images of, for example, 64 pixels×64 pixels, for example, but the SR engine 115 trains and operates at higher resolution fingerprint images of, for example, 256 pixels×256 pixels. As such, the pre-processed, real fingerprint image 204A may be stored in a high quality (HQ) database (or dataset) 205A at a resolution of 256 pixels×256 pixels, and stored in a low quality (LQ) database (or dataset) 205B as pre-processed, real fingerprint images 204B at resolution of 64 pixels×64 pixels.

When the LQ database 205B of real fingerprints is created, the GAN 110 can be trained. The GAN 110 may be trained, based on the pre-processed, real fingerprint images to generate and then output 112 low quality, synthetic fingerprints. The GAN may generate this low quality, synthetic fingerprints based on an input vector, such as an input noise vector (e.g., a seed, random value, and/or the like). For example, an input vector is provided as an input to the trained GAN 110, and the trained GAN outputs a corresponding low quality, synthetic fingerprint at 64×64 pixels. To generate and output a plurality of low quality, synthetic fingerprint outputs 112, a plurality of input vectors is provided to the trained GAN 110.

During training, the generative network (labeled generator 110A) tries to generate synthetic fingerprint samples 266A from the given data distribution of real fingerprints 205B. These synthetic (labeled fake 266A) fingerprint samples are provided to the discriminator network 110B, so the discriminator 110 can learn to distinguish the synthetic fingerprint samples (which are generated by the generative network) from the real fingerprint data samples at database 205B. During the training phase of the GAN, the feedback 266B from the discriminator 110B network to the generator 110A is used to enhance the quality of the samples produced by the generator 110A. In this way, the GAN 110 when trained can provide a model that estimates the probability distribution of real fingerprints.

Although there are a variety of types, options, structures for the GAN 110 (e.g., in terms of the number and size of the layers, optimization loss and method, and like), the GAN may comprise a Wasserstein GAN (WGAN), in accordance with some example embodiments. The Wasserstein GAN may be used due in part to its Earth-Mover distance loss function for comparing the target and real distributions. Unlike the traditional Minimax loss function, the Earth-Mover distance is a truer metric to measure distances in the space of probability distributions. This Earth-Mover distance loss function helps the stabilization of the training process of GANs and reduces the possibility of several problems, such as vanishing gradients and mode collapse (which might otherwise be an issue with the small volume of the real fingerprints that are publicly-available). The vanishing gradients problem arises because at the beginning of the training process, fake samples are easily distinguishable from the real samples; thus, the gradients computed during backpropagation are not helpful to tune the generative model. In Wasserstein GAN, the discriminator model outputs a number instead of a probability estimation. The discriminator's job is to maximize the difference between the output number of real and fake samples (and not discriminate); thus, it is usually referred to as critic. This enables the gradients to be informative, even at the beginning of the training process. The mode collapse problem is due to the fact that the generator can converge to a state that only produces a few plausible samples that can fool the discriminator. This problem is particularly important to have high entropy. High entropy enables generation of a many fingerprint samples that are significantly different (e.g., enables scaling to provide generation of millions or billions of unique fingerprint samples). In short, the Wasserstein GAN may avoid the mode collapse problem as the discriminator 110B can separately be trained to optimality and quickly detect fake samples, forcing the generator 110A to search for new samples.

Although the previous example refers to WGAN configured with the Earth-Mover distance loss function, other types of GANs and machine learning may be used as well to provide the super resolution that transforms the low resolution fingerprint into a high resolution fingerprint.

Referring to the GAN 110 of FIG. 2, the generator 110A and the discriminator 110B may have the same or similar structure but in reverse order. For example, the generator 110A starts with an initial noise vector of size 100; the noise vector goes through a series of fractionally-strided convolutions in which the number of channels is reduced (e.g., by a factor of two) while the image size is increased (e.g., by a factor of two) before yielding a low quality (LQ) 64 by 64 image 112. In the discriminator, the intermediate layers are regular convolution layers, rather than the fractionally-strided layers. At this point, one may wonder why the GAN's output 112 cannot be used directly without the transformation provided by the SR engine 115. The fingerprint samples 112 are, as noted, of a low quality. But even after incorporating the above WGAN optimizations and testing various configurations and different parameters, the trained GAN 110 model may not be capable of generating fingerprints with a high quality for image sizes larger than 64×64 pixels. As shown in FIG. 1B, the quality of the output of the GAN at 256×256 pixel samples is insufficient for most authentication and/or identification systems that operate at 256×256, so the SR engine 115 is used in a second phase.

The SR engine 115 may provide a model that transforms the low-quality images 112 (which is provided by the trained GAN 110) into a high-resolution image 117 with detailed texture (e.g., 256×256 pixels to enable authentication and/or identification). For example, the SR engine may be trained learn how to recover a high-resolution FIR) image from a low resolution (LR) image. Although some of the examples refer to specific resolutions, such as 256×256 and 64×64, these are examples as other resolutions may be implemented in accordance with some of the embodiments disclosed herein.

In some example embodiments, super-resolution mechanisms may learn to improve the quality of the input image using many, lower-quality images. As the low-quality image 112 is generated from an initial noise vector, multiple low quality images of the same synthetic finger cannot be produced for training. As such, the SR engine 115 is a single-image, super-resolution solution that receives, as an input, only a single low resolution image and generates, as an output, a higher-quality image.

In some example embodiments, the SR engine 115 comprises an Enhanced Super-Resolution Generative Adversarial Network (ES-RGAN) including Residual-in-Residual Dense Blocks (RRDB). The SR engine 115 architecture includes a series of one or more RRDBs 240A-B surrounded by (e.g., sandwiched between) convolutional (Cony) layers 242A-B. Moreover, there may be one or more upsampling layers 277A-B (UpConv) after the RRDBs and before the convolution layers 279A-B. In contrast to the GAN 110 phase, Batch Normalization (BN) layers may be removed as the BN layers increase the possibility of artifacts being added to the image. Relying on the RRDB basic block enables incorporation of a higher number of hidden layers. The SR engine also leverages residual scaling (e.g., residuals, such as the output of basic blocks 240A, 240B and so forth) are scaled down by a constant β 244A, 244B, and so forth (0<β<1) before being added 246A, B to the main path 248. In the example of FIG. 2, the weights are initialized with small-variance random numbers to improve convergence.

In the example of FIG. 2, the SR engine is structured to have a convolutional layer 242A followed by a series of blocks, such as 23 blocks of RRDBs, convolutional layers (cony), constants β, upconverters, and adders. Moreover, there are two upsampling/upconverters and two convolution layers. Each basic block includes three residual sub-blocks, where each sub-block has five convolutional layers. The convolutional layers have 64 channels with a kernel size of 3. The activation function in the RRDB is a leaky ReLU with a slope of 0.2 in the negative part. The output of the SR model is a 256×256 image with one channel (a gray-scale image).

In the SR engine 115 model, the discriminator may be implemented as a Relativistic average Discriminator (RaD), for example (although other types of discriminators may be implemented as well). The GAN's 110 discriminator estimates the probability that a sample is real. By contrast, the SR engine's discriminator estimates the probability that a real image is (relatively) more realistic than a fake/synthetic image. Specifically, the RaD is formulated as:

$$D(x_r,x_f)=\sigma(C(x_r))-\mathbb{E}_{x_f}[C(x_f)]$$

where D( ) is the output of discriminator, $x_r$ is the real sample, $x_f$ is the fake sample, C( ) is the non-transformed discriminator output, σ( ) is the Sigmoid function, and $\mathbb{E}_{x_f}[$ ] represents taking an average over all fake samples in the batch. The discriminator's and generator's loss are:

$$L_D=-E_{x_r}[\log(D(x_r,x_f))]-E_{x_f}[\log(1-D(x_f,x_r))]$$

$$L_G=-E_{x_r}[\log(1-D(x_r,x_f))]-E_{x_f}[\log(D(x_f,x_r))]$$

In other words, the SR engine trains by learning whether a real image is more realistic than a fake/synthetic image. After training the SR model 115, the SR engine 115 provides a model used to transform a single, low quality synthetic fingerprint 112 into a high resolution synthetic fingerprints 117.

In some embodiments, the SR engine 115 is more complex architecture, when compared to the GAN 110. For example, the SR model includes as an initial stage a convolutional layer 242A followed by a series of basic blocks 240A, 240B and so forth; the tail end includes two upsampling layers (labeled upConv) 277A-B and two convolution layers 279A-B. Each of the basic blocks includes three residual sub-blocks, where each sub-block has five convolutional layers. The convolutional layers have 64 channels with a kernel size of 3. The activation function in RRDB is a leaky rectifier linear unit (ReLU) with a slope of 0.2 in the negative part. The output 117 of the SR engine model may be, for example, a 256×256 image with one channel, such as a single gray-scale image.

Although some of the examples above describe fingerprint images, the system 100 and 200 may be used with other types of data including other types of biometric data. For example, although a fingerprint may be captured by a sensor as an image, the fingerprint may be captured and then stored in other formats as well. Moreover, the fingerprint may include other types of biometric data captured from the eye, veins, etc.

Figure 3:
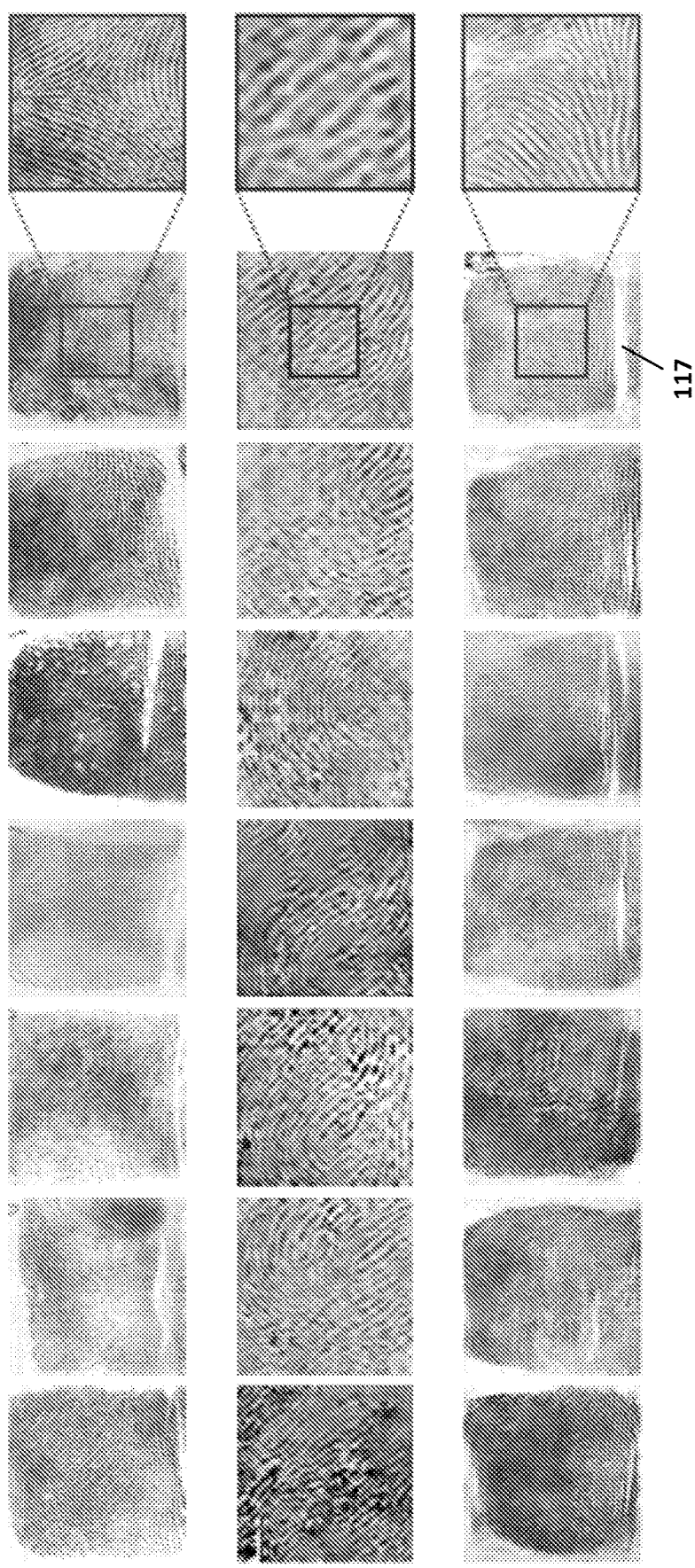
FIG. 3 depicts examples of samples of real fingerprints (top row), synthetic fingerprints (bottom row) generated by a system in accordance with the features discloses herein, and synthetic fingerprints (middle row) generated by another system that is not configured with the features disclosed herein.

FIG. 3 shows samples of real fingerprints obtained from the NIST dataset (top row), synthetic fingerprints (bottom row) generated by the system in accordance with the features discloses herein (e.g., FIG. 1A or 2), and for comparison, synthetic fingerprints (middle row) generated by another system that is not configured with the features disclose herein. FIG. 3 shows that the synthetic fingerprints of the bottom row including synthetic fingerprint 117 appears significantly more realistic when compared to the synthetic fingerprints of the middle row. The right-most column shows a magnified view of the details of the impressions, which further shows the quality of the produced samples.

As noted the synthetic fingerprint 117 (as well as the others in the bottom row) appears significantly more realistic and thus comparable to the real fingerprints in the top row. For the synthetic fingerprints to be useful, the synthetic fingerprints should be indistinguishable (at some level) from the real fingerprint samples at the top row to enable the synthetic fingerprints samples to improve the quality and performance of authentication systems using fingerprints. To quantify how distinguishable synthetic fingerprints are from real fingerprints, an analysis was performed. The fingerprint subjects in the NIST dataset are partitioned into training and test samples with 2200 and 500 subjects, respectively; two disjoint sets of synthetic fingerprints (one for the training phase and one for the test phase) are created as well. To minimize the classifier's bias, an equal number of real and synthetic fingerprints are placed in the test dataset. Next, six different machine learning models (e.g., a Logistic Regression (LR) model, a Support Vector Machine (SVM) with linear kernel, a Random Forest with 10 estimators, and three different Deep Neural Network (DNN) models with four, five, and eight layers) are trained. The training process is formalized as a binary classification problem in which real fingerprints are labeled as zero, and synthetic samples are labeled as one. After training the six machine learning models, the ML models are evaluated on an unseen test set consisting of real and synthetic samples. The performance of these binary classifiers are reported in Table I using three standard metrics: Accuracy (ACC) which reflects the percentage of correct answers by the classifier, False Positive Rate (FPR) which is defined as the ratio of wrongly classified samples as positive over all negative samples (both truly negative and incorrectly classified samples as positive). The third metric False Negative Rate (FNR) is the ratio of the number of samples falsely labeled as negative over all positive samples (both true positives and misclassified samples as negative). During the training process, these ML models were trained to learn the underlying pattern of fingerprints and reached the training accuracy of up to 99.76%. However, when evaluating these models on a set of unseen samples, the best performing classifier was the four-layer DNN with 100 and 20 neurons in the hidden layers and classification accuracy of 50.43%. In other words, the best classifier could distinguish synthetic fingerprints from real ones only 0.43% better than a random guess.

TABLE I

ANALYZING INDISTINGUISHABILITY OF SYNTHETIC FINGERPRINTS AGAINST THE REAL ONES USING VARIOUS MACHINE LEARNING MODELS.

| Model Type | Model Description | ACC(%) | FPR(%) | FNR(%) |
| --- | --- | --- | --- | --- |
| Logistic Regression | L2 regularization | 49.99 | 0.01 | 99.99 |
| Linear SVM | L2 regularization, C = 1 | 50.01 | 0.06 | 99.91 |
| Random Forest | Using 10 estimators | 49.47 | 13.08 | 87.96 |
| 4-Layer DNN | Hidden Layers: 100,20 | 50.43 | 19.78 | 79.35 |
| 5-Layer DNN | Hidden Layers: 100, 50, 10 | 50.35 | 11.36 | 87.93 |
| 8-Layer DNN | Hidden Layers: 800, 400, 200, 100, 50, 20 | 49.85 | 23.25 | 77.03 |

Figure 4:
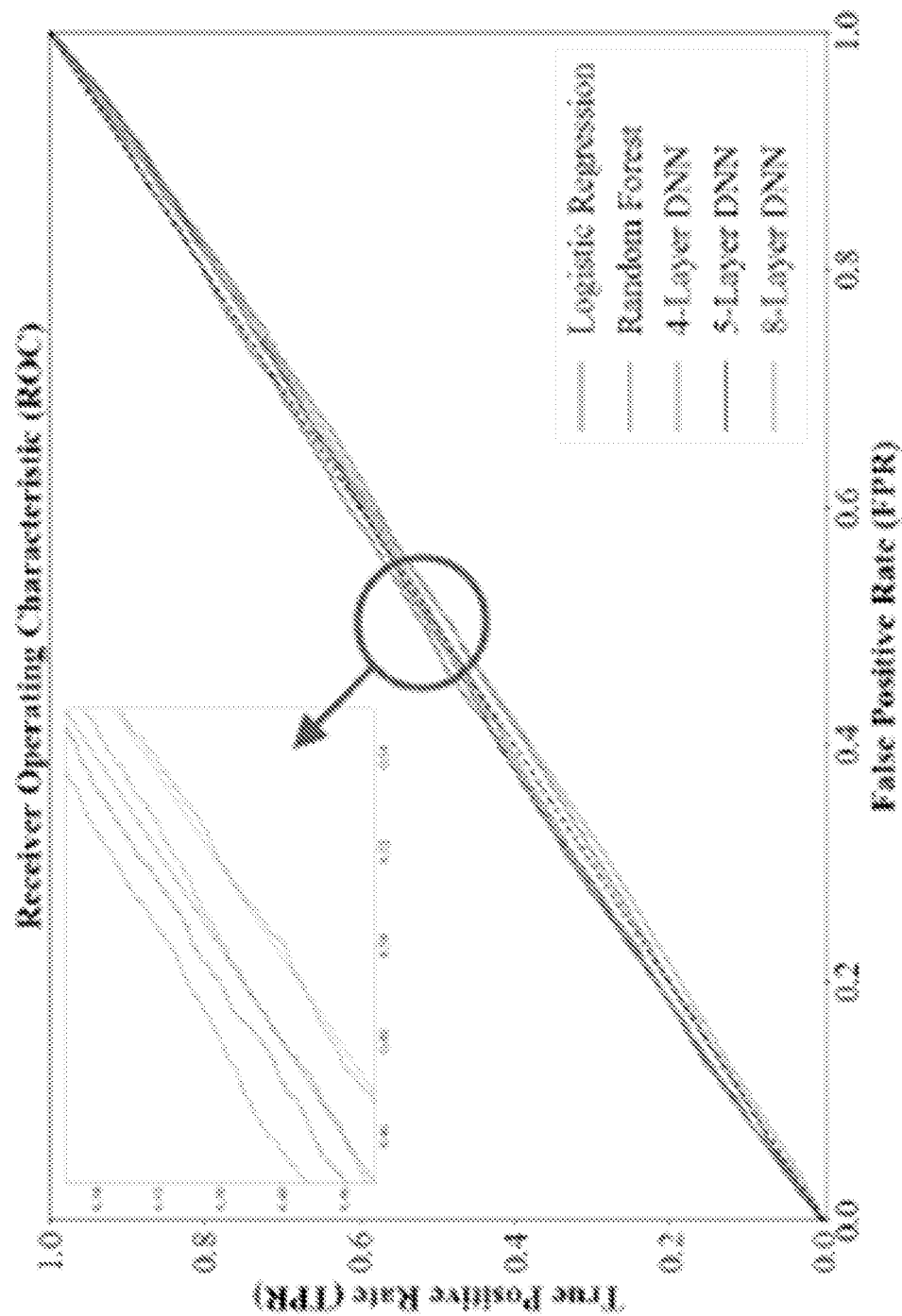
FIG. 4 depicts an example of a plot showing how well machine learning models distinguish between real fingerprints and the synthetic fingerprints generated in accordance with some example embodiments.

One can also analyze the effectiveness of the classifiers using a Receiver Operating Characteristic (ROC) curve as shown at FIG. 4. FIG. 4 depicts the True Positive Rate (TPR) against FPR. TPR is defined as TPR=1−FNR. FIG. 4 shows the ROC curve of five ML models (ROC curve is not well defined for SVMs). Relying on a purely random guess results in the black diagonal dashed line, which is the baseline for indistinguishability. Conceptually, ROC visualizes the fact that the classifiers' threshold for classifying an image as real or fake results in a trade-off between FPR and FNR (or TPR). Choosing a very low threshold leads to marking many real images as fake, hence, high FPR. Choosing a very high threshold results in outputting many fake images as real, thus, high FNR. However, as can be seen, regardless of the chosen value for the threshold, none of the classifiers can perform reasonably better than a purely random guess.

Figure 5:
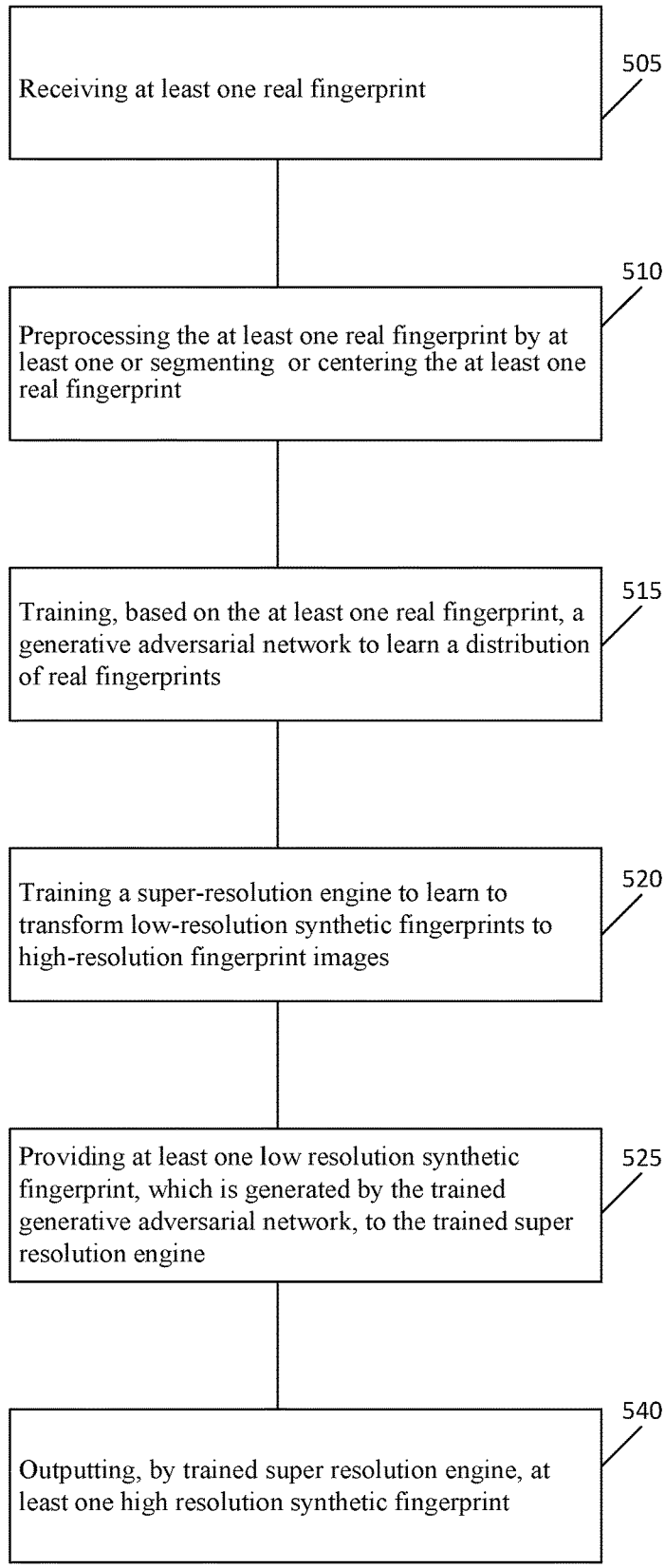
FIG. 5 depicts an example of a process for generating synthetic fingerprints, in accordance with some example embodiments.

FIG. 5 depicts an example of a process 500 for generating synthetic fingerprints, in accordance with some example embodiments.

At 505, at least one real fingerprint may be received. For example, the system 100 or 200 may receive at least one real fingerprint from a database, such as database 105, or directly from a sensor that captures the fingerprint. As noted, the fingerprint may correspond to data representative of at least one finger. Alternatively, or additionally, the fingerprint may correspond to other types of biometric data as well. At 510, preprocessing of the at least one real fingerprint may be performed. The preprocessing may include segmenting and/or centering the at least one real fingerprint.

At 515, the generative adversarial network 110 may be trained to learn a distribution of real fingerprints. During the training phase of the generative adversarial network, feedback from the discriminator network is used to enhance the quality of the fingerprint samples produced by the generative network. This training repeats until the GAN 110 converges and provides a model that estimates the probability distribution of real fingerprints.

At 520, the SR engine 115 is also trained. The SR engine trains by learning whether a real fingerprint is more realistic than a synthetic fingerprint image. After training the SR model 115, the SR engine 115 provides a model used to transform a single, low quality synthetic fingerprint 112 into a high resolution synthetic fingerprints 117.

After the training phase (e.g., in response to training), the trained generative adversarial network may provide, at 525, as an output at least one low resolution synthetic fingerprint 112. This at least one low resolution synthetic fingerprint output may serve as an input to the SR engine 115. At 530, the trained SR engine 115 transforms the at least one low resolution synthetic fingerprint into at least one high resolution synthetic fingerprint.

Figure 6:
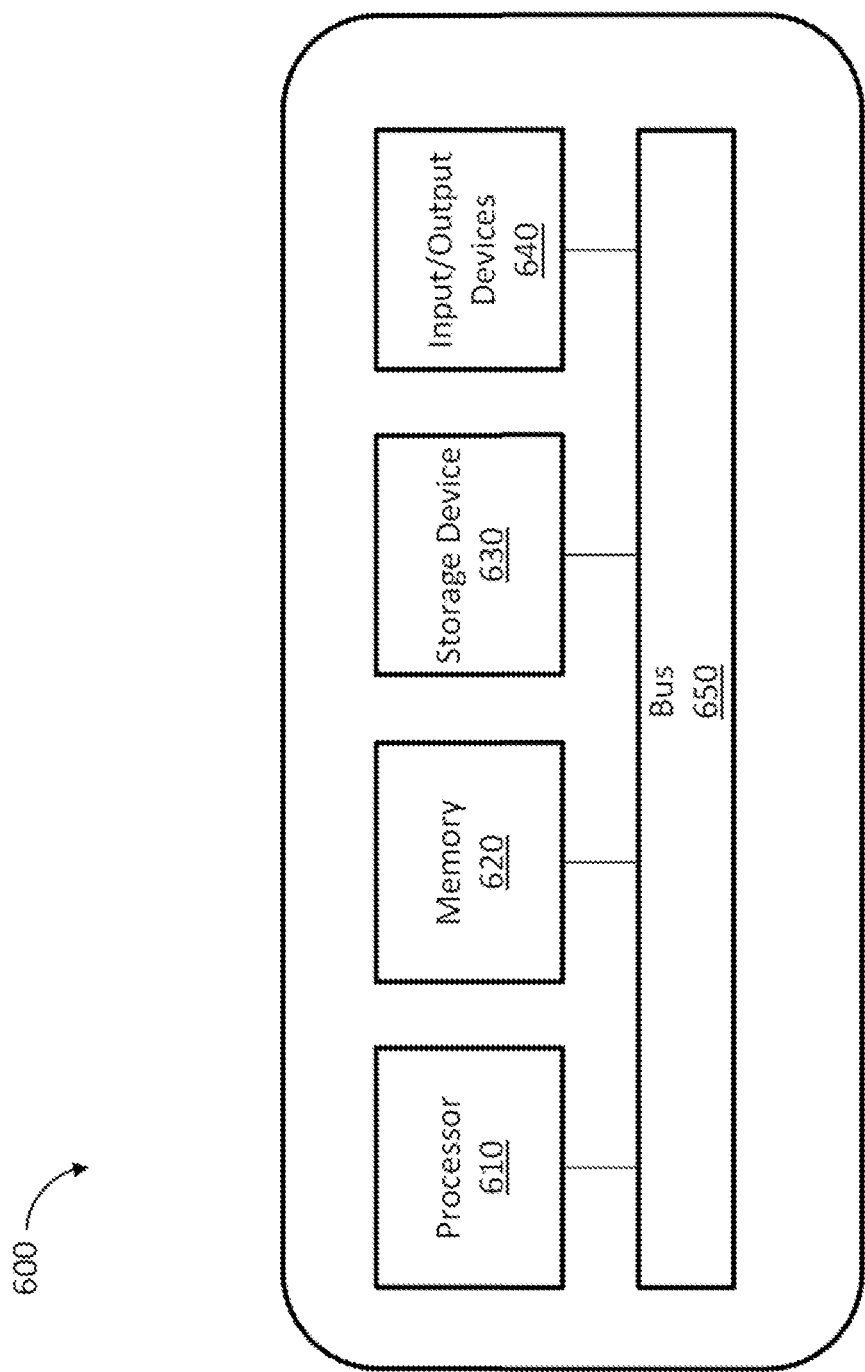
FIG. 6 depicts a block diagram illustrating a computing system consistent with implementations of the current subject matter.

FIG. 6 depicts a block diagram illustrating a computing system 600 consistent with implementations of the current subject matter. For example, the system 600 can be used to implement the components disclosed at FIGS. 1A and 2 (e.g., the GAN, SR engine, and the like). As shown at FIG. 6, the computing system 600 can include a processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. In some implementations of the current subject matter, the processor 610 can be a single-threaded processor. Alternately, the processor 610 can be a multi-threaded processor. The process may be a multi-core processor, a graphics processor (GPU), and/or the like. The processor 610 is capable of processing instructions stored in the memory 620 and/or on the storage device 630 to display graphical information for a user interface provided via the input/output device 640. The memory 620 is a computer readable medium such as volatile or non-volatile that stores information within the computing system 600. The memory 620 can store data structures representing configuration object databases, for example. The storage device 630 is capable of providing persistent storage for the computing system 400. The storage device 630 can be a floppy disk device, a hard disk device, an optical disk device, or a tape device, or other suitable persistent storage mechanism. The input/output device 640 provides input/output operations for the computing system 600. In some implementations of the current subject matter, the input/output device 640 includes a keyboard and/or pointing device. In various implementations, the input/output device 640 includes a display unit for displaying graphical user interfaces. According to some implementations of the current subject matter, the input/output device 640 can provide input/output operations for a network device. For example, the input/output device 640 can include Ethernet ports or other networking ports to communicate with one or more wired and/or wireless networks (e.g., a local area network (LAN), a wide area network (WAN), the Internet).

The low resolution fingerprint described in some of the examples above may refer to a low resolution fingerprint lacking the information to enable a determination of the minutiae characteristics, such as ridge bifurcations, endings, and/or the like. These low resolution fingerprints may be visually and/or computationally distinguishable from real fingerprints. By contrast, the high resolution fingerprint may refer to a fingerprint having the information to enable a determination of the minutiae characteristics, such as ridge bifurcations, endings, and/or the like. These high resolution fingerprints may not be visually and/or computationally distinguishable from real fingerprints.

One or more aspects or features of the subject matter described herein can be realized in digital electronic circuitry, integrated circuitry, specially designed application specific integrated circuits (ASICs), Graphics Processor Units (GPUs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for generating synthetic human fingerprints, the system comprising at least one processor and at least one memory storing instructions which when executed by the at least one processor cause operations comprising:

receiving, from a database and/or a sensor, at least one real fingerprint;

training, based on the at least one real fingerprint, a generative adversarial network to learn a distribution of real fingerprints;

training a super-resolution engine to learn to transform low resolution synthetic fingerprints to high resolution fingerprints;

providing to the trained super-resolution engine at least one low resolution synthetic fingerprint that is generated as an output by the trained generative adversarial network; and in response to the providing, outputting, by the trained super-resolution engine, at least one high resolution synthetic fingerprint by up converting a resolution of the at least one low resolution synthetic fingerprint while maintaining a texture of at least one ridge ending and at least one bifurcation of the at least one low resolution synthetic fingerprint.

2. The system of claim 1, wherein the at least one high resolution synthetic fingerprint is categorized as relatively rare based on a structure and a curvature of the at least one high resolution synthetic fingerprint, and wherein the at least one high resolution synthetic fingerprint categorized as relatively rare enables verification of a fingerprint-based authentication methodology.

3. The system of claim 2, wherein the at least one real fingerprint comprises biometric data, and wherein the biometric data is collected from at least one of a human finger, a human eye, a retina, an iris, a vein, an artery, and/or a voice.

4. The system of claim 1 further comprising:
preprocessing the at least one real fingerprint by at least one of segmenting or centering the at least one real fingerprint.

5. The system of claim 4, wherein the preprocessing further comprises storing the at least one real fingerprint in a first database at a first resolution and storing the at least one real fingerprint in a second database in a second, lower resolution.

6. The system of claim 5, wherein the training of the generative adversarial network, is based on the at least one real fingerprint stored in the second, lower resolution, and wherein the training of the super-resolution engine is based on the at least one real fingerprint stored in the first resolution.

7. The system of claim 1, wherein the generative adversarial network comprises a Wasserstein generative adversarial network including an earth-mover distance loss function.

8. The system of claim 1, wherein the training of the generative adversarial network comprises providing synthetic fingerprint samples and the at least one real fingerprint to a discriminator, wherein the discriminator provides feedback to a generator to learn to distinguish synthetic fingerprint samples from the real fingerprint samples.

9. The system of claim 1, wherein the super-resolution engine comprises a Generative Adversarial Network and/or an Enhanced Super-Resolution Generative Adversarial Network.

10. The system of claim 1, wherein the super-resolution engine comprises a plurality of residual dense blocks sandwiched within a first convolution layer and a second convolutional layer, wherein an output of the second convolutional layer is provided to at least one upsampling layer, wherein the upsampling layer is further coupled to at least one output convolutional layer configured to output a high quality fingerprint sample.

11. The system of claim 1, wherein the training of the super-resolution engine comprises learning whether a real fingerprint is more realistic than a synthetic fingerprint.

12. A method comprising:
receiving, from a database and/or a sensor, at least one real fingerprint;
training, based on the at least one real fingerprint, a generative adversarial network to learn a distribution of real fingerprints;
training a super-resolution engine to learn to transform low resolution synthetic fingerprints to high resolution fingerprints;
providing to the trained super-resolution engine at least one low resolution synthetic fingerprint that is generated as an output by the trained generative adversarial network; and
in response to the providing, outputting, by the trained super-resolution engine, at least one high resolution synthetic fingerprint by up converting a resolution of the at least one low resolution synthetic fingerprint while maintaining a texture of at least one ridge ending and at least one bifurcation of the at least one low resolution synthetic fingerprint.

13. The method of claim 12, wherein the at least one high resolution synthetic fingerprint is categorized as relatively rare based on a structure and a curvature of the at least one high resolution synthetic fingerprint, and wherein the at least one high resolution synthetic fingerprint categorized as relatively rare enables verification of a fingerprint-based authentication methodology.

14. The method of claim 13, wherein the at least one real fingerprint comprises biometric data, and wherein the biometric data is collected from at least one of a human finger, a human eye, a retina, an iris, a vein, an artery, and/or a voice.

15. The method of claim 12 further comprising:
preprocessing the at least one real fingerprint by at least one of segmenting or centering the at least one real fingerprint.

16. The method of claim 15, wherein the preprocessing further comprises storing the at least one real fingerprint in a first database at a first resolution and storing the at least one real fingerprint in a second database in a second, lower resolution.

17. The method of claim 16, wherein the training of the generative adversarial network, is based on the at least one real fingerprint stored in the second, lower resolution, and wherein the training of the super-resolution engine is based on the at least one real fingerprint stored in the first resolution.

18. The method of claim 12, wherein the generative adversarial network comprises a Wasserstein generative adversarial network including an earth-mover distance loss function.

19. The method of claim 12, wherein the training of the generative adversarial network comprises providing synthetic fingerprint samples and the at least one real fingerprint to a discriminator, wherein the discriminator provides feedback to a generator to learn to distinguish synthetic fingerprint samples from the real fingerprint samples.

20. A non-transitory computer-readable medium including instruction which when executed by at least one processor causes operations comprising:
receiving, from a database and/or a sensor, at least one real fingerprint;

training, based on the at least one real fingerprint, a generative adversarial network to learn a distribution of real fingerprints;

training a super-resolution engine to learn to transform low resolution synthetic fingerprints to high resolution fingerprints;

providing to the trained super-resolution engine at least one low resolution synthetic fingerprint that is generated as an output by the trained generative adversarial network; and in response to the providing, outputting, by the trained super-resolution engine, at least one high resolution synthetic fingerprint by up converting a resolution of the at least one low resolution synthetic fingerprint while maintaining a texture of at least one ridge ending and at least one bifurcation of the at least one low resolution synthetic fingerprint.

* * * * *